T. A. DRING.
FLYING MACHINE.
APPLICATION FILED MAY 26, 1910.
1,034,429.
Patented Aug. 6, 1912.
2 SHEETS—SHEET 1.
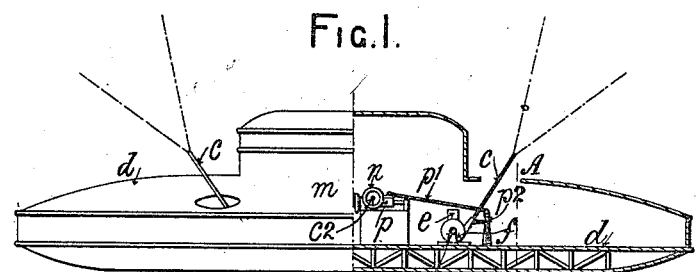
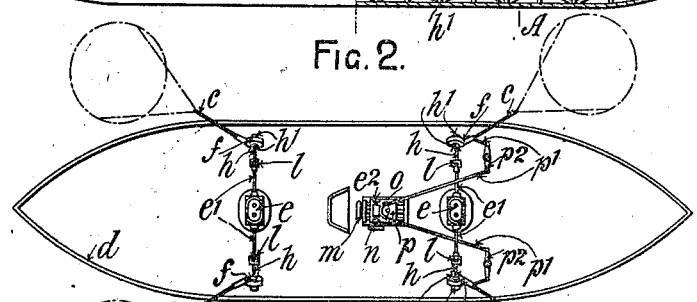
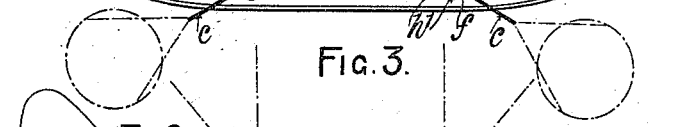
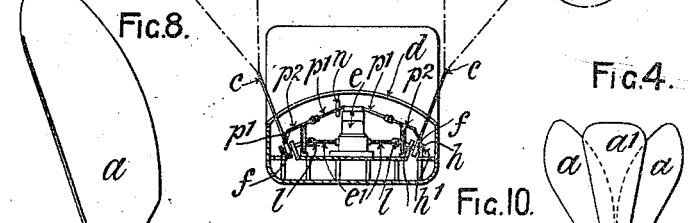
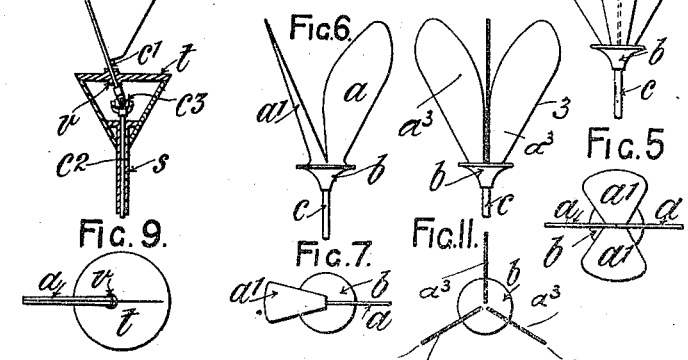
WITNESSES.
INVENTOR.
T. A. Dring.
by Herbert W. Jenner
Attorney

T. A. DRING.
FLYING MACHINE.
APPLICATION FILED MAY 26, 1910.

1,034,429.

Patented Aug. 6, 1912.

2 SHEETS—SHEET 2.

WITNESSES

INVENTOR.
T. A. Dring
by Herbert W. Jenner
Attorney.

UNITED STATES PATENT OFFICE.

THOMAS AUGUSTUS DRING, OF TROWBRIDGE, ENGLAND.

FLYING-MACHINE.

1,034,429. Specification of Letters Patent. Patented Aug. 6, 1912.

Application filed May 26, 1910. Serial No. 563,631.

*To all whom it may concern:*

Be it known that I, THOMAS AUGUSTUS DRING, a subject of the King of Great Britain and Ireland, and residing at Sunny Bank, Trowbridge, in the county of Wilts, England, have invented new and useful Improvements in Flying-Machines, of which the following is a specification.

This invention relates to flying machines of the heavier-than-air type, and it has primarily for its object enabling such machines to rise directly in the vertical plane and also to soar or poise. I attain this end by utilizing the underlying principle which governs the flight of such insects as the humble-bee and the house-fly, which lift and propel themselves by creating vortices in the air immediately above their bodies. The wings of these insects when in action each have a rotary motion in a conical path mainly or entirely above the level of the body, the apices of said paths being coincident with the roots of the wings. The actions and reactions produced in the air by this movement of the wings sustain the insect against the downward pull of gravity, and as the insect has the power of varying the angle of rotation of its wings it can:—(a) lift itself in a vertical plane; (b) travel forward or backward by varying the angle of rotation of its wings; and (c) turn to the right or left by inclining one rotating wing forward and the other backward. I carry this principle into practice by using two or more devices adapted to produce in the air the same effects as are produced by the wings of these insects. These devices—which I call "vortex lifters"—each consist of a shaft adapted to be rapidly rotated and carrying a plurality of radial blades or vanes, constructed and arranged as hereinafter fully described and claimed.

In the accompanying drawing, which shows by way of illustration some methods of carrying this invention into practice:—

Figure 12:
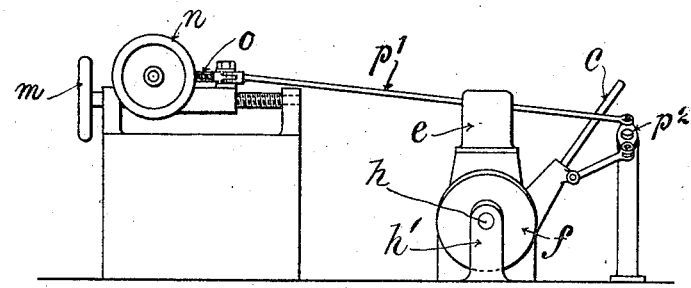
Figure 13:
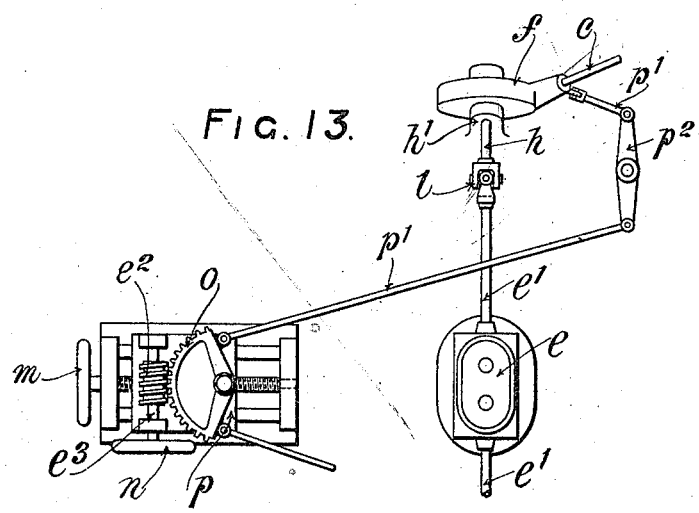
Figure 14:
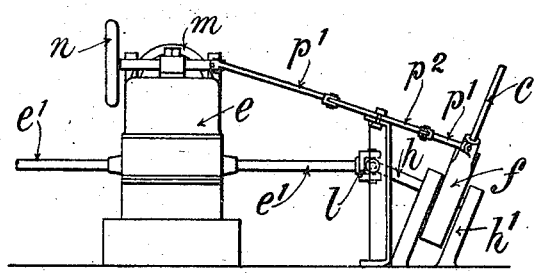

Figure 1 is a diagrammatic view in side elevation, partly in section showing one form the machine may assume; Fig. 2 is a diagrammatic view in plan thereof; and Fig. 3 is a transverse section on line A A Fig. 1; Figs. 4 and 5, 6 and 7, 8 and 9, 10 and 11 are views in elevation and plan respectively showing various ways the blades or vanes of the vortex lifter may be arranged. Figs. 12, 13, and 14, show, respectively, a side view, a plan view, and an end view, of portions of the operating devices, drawn to a larger scale.

Throughout the views similar parts are marked with like letters of reference.

Referring to Figs. 1, 2 and 3. The body $d$ of the machine, which may be made of any suitable construction and material, preferably takes the form of a boat and is provided with four "vortex lifters," two being arranged toward one end of the machine and the other two toward the other end, the arrangement being such that with each pair operating alike and set to lift vertically the machine will be lifted on an even keel. The two shafts $c$ of each pair of "vortex lifters" are preferably driven by an independent motor $e$, but this is not obligatory. The motors may be of any suitable type and construction. On each side of each motor $e$ is a gear case $f$ which carries the shaft $c$ of the "vortex lifter" and a shaft $h$ at right angles thereto, said two shafts being geared together by a worm and worm wheel or other suitable gearing. The shafts $h$ are mounted in suitable bearings $h^1$, $h^1$ which are mounted on the framework of the machine in such a manner that the lifting stresses can be imparted through them, and said shafts are connected with the crank-shaft $e^1$ of the motor $e$ by universal joints $l$. The two gear cases of each pair of lifting devices are connected to two controlling wheels $m$ and $n$ by any suitable mechanism so that the simultaneous inclination of the two "vortex lifters" in the same direction can be effected by one of the said wheels, and the inclination of said "vortex lifters" in opposite directions by the other wheel. A convenient mechanism is that shown in the accompanying drawing which consists of a quadrant $o$ pivoted on a plate $p$ adapted to slide in suitable guides and to be moved therein by means of the wheel $m$, said plate being connected to the gear cases $f$ by means of the links $p^1$ and the rocking levers $p^2$. Gearing with the quadrant $o$ is a worm $e^2$ secured on a shaft $e^3$ on which the wheel $n$ is mounted.

In the construction illustrated one pair only of the "vortex lifters" are arranged to have their angles of inclination varied for the purpose of propelling and steering in the horizontal plane, the other two being mounted in fixed bearings, but all four may be so mounted and connected without departing from the spirit and scope of this invention.

The "vortex lifters" may either be constructed and arranged to operate in identically the same manner as the wings of the insects hereinbefore referred to, in which case each has a single blade or vane as shown in Figs. 8 and 9, said blade being given a rotary movement in a conical path about a fixed point and at the same time prevented from rotating about its own axis by mechanism such as that shown in aforesaid views, which consist of a shaft $c^1$ on which is mounted the blade or vane $a$, of a fixed shaft $c^2$ to one end of which the shaft $c^1$ is attached by means of a suitable universal joint $c^3$, of a driving shaft $s$ mounted outside the fixed shaft $c^2$, and of a plate $t$ mounted on the driving shaft $s$ and carrying an eccentrically arranged bearing $v$ for the shaft $c^1$. To avoid the complication which this construction involves the "vortex lifters" may have one or more pairs of blades or vanes as shown in Figs. 4, 5, 6 and 7 which are arranged to rotate about a common axis, one blade or vane $a$ of each pair being arranged with its surface at right angles to the direction of its motion and the other blade or vane $a^1$ of each pair with its surfaces edgewise to the direction of its motion.

The preferred form of constructing and arranging the blades or vanes is shown in Figs. 10 and 11. Three flat blades $a^3$ are arranged radially of the shaft $c$, and are broader at their upper ends than at their lower ends. The outer edges 3 of these blades are arranged at an acute angle to the axis of the shaft $c$, so that the said blades describe an inverted cone when revolving.

Although the machine has been described as having a plurality of "vortex lifters," it will be evident that only one such device may be employed if the shape and construction of the machine is such that its resistance to rotation in the air is sufficient to overbalance the thrust of the "vortex lifter."

What I claim as my invention and desire to secure by Letters Patent is:—

1. In a flying machine, a combined lifting and propelling device, comprising a revoluble shaft, and a plurality of flat blades or vanes mounted on said shaft and lying in radial planes in relation thereto, the outer edges of said blades or vanes being arranged at an acute angle to the axis of the shaft so that they describe an inverted cone when revolving.

2. In a flying machine, a combined lifting and propelling device, comprising a revoluble shaft, and a plurality of flat blades or vanes having their lower portions secured to the shaft and their main portions projecting above its upper end, said blades or vanes lying in radial planes with their outer edges arranged at an acute angle to its axis, and adapted to describe an inverted cone when revolving.

3. In a flying machine, the combination, with two lifting and propelling devices, each comprising a revoluble shaft, and a plurality of flat blades or vanes arranged in radial planes around the said shaft with their outer edges arranged and adapted to describe an inverted cone when revolving; of adjustable means for supporting the said shafts at various angles with the vertical.

4. In a flying machine, the combination, with two lifting and propelling devices, each comprising a revoluble shaft, and a plurality of blades or vanes secured radially around the said shaft with their outer edges arranged at an acute angle to its axis, and adapted to describe an inverted cone when revolving; of means for supporting the said shafts side by side, adjusting mechanism for moving the said shafts simultaneously in one direction to various angles with the vertical, and separate adjusting devices for moving the said shafts in different directions to various other angles with the vertical.

5. In a flying machine, a lifting device comprising a shaft adapted to be rapidly rotated, pairs of blades or vanes mounted on a common hub or center on said shaft, said blades having their outer ends wider than their inner ends, one blade or vane of each pair being arranged with its flat surfaces at right angles to the direction of rotation and the other of each pair with its edges at right angles to the direction of rotation, as set forth.

6. In a flying machine, a lifting and propelling device comprising a shaft adapted to be rapidly rotated, pairs of blades or vanes mounted on a common hub or center on said shaft said blades having their outer ends wider than their inner ends, one blade or vane of each pair being arranged with its flat surfaces at right angles to the direction of rotation and the other of each pair with its edges at right angles to the direction of rotation, and means for varying the angle at which said device operates, as set forth.

THOMAS AUGUSTUS DRING.

Witnesses:
R. T. WILLIAMS,
H. D. JAMESON.